United States Patent [19]
Knipe et al.

[11] Patent Number: 5,489,443
[45] Date of Patent: Feb. 6, 1996

[54] PROCESS FOR TREATING PORK CUTS WITH PSE PORK AND COMPOSITION THEREOF

[75] Inventors: C. Lynn Knipe, Ames, Iowa; Rao Mandava, Vevey, Switzerland

[73] Assignees: Nestec S.A., Vevey, Switzerland; Iowa State University & Research Foundation, Inc., Ames, Iowa

[21] Appl. No.: 347,959

[22] Filed: Dec. 1, 1994

[51] Int. Cl.$^6$ .............................. A23L 1/314; A23L 1/318
[52] U.S. Cl. .......................... 426/264; 426/265; 426/281; 426/641; 426/646
[58] Field of Search ................................. 426/264, 265, 426/281, 641, 646

[56] References Cited

U.S. PATENT DOCUMENTS

| | | | |
|---|---|---|---|
| 4,402,987 | 9/1983 | von Lersner et al. | 426/281 |
| 4,960,599 | 10/1990 | Cozzini et al. | 426/281 |

OTHER PUBLICATIONS

Ashbrook, Butchering, Processing and Preservation of Meat, 1955, Van Reinhold Company, NY, N.Y. pp. 231–247.

Dubbs et al., The East Art of Smoking Food, 1977, Winchester Press, Inc., NY, N.Y. 3–7, 45–47, 68–69 and 113–115.

Topel, et al., "Porcine Stress Syndrome", Modern Veterinary Practice 49:40, 1968.

Penny, "Protein Denaturation and Water–Holding Capacity in Pork Muscle," J. Ed. Technol. (1969) 4,269–273.

Dolatowski, "Influence of Blood Plasma on the Quality of Smoked Ham from PSE Meat," Fleischwirtsch, 66(2) 225–230 (1986).

Wirth, "The Technology of Processing Meat Not of Standard Quality," Fleischwirtsch 66(8), 1256–1260 (1986).

Knipe, et al., "Effects of Stress–Susceptibility of Hogs and Procesing Treatments on the Quality of Pork Products" Proc. Int. Congress of Meat and Sci. Tech. vol. 2, p. 662, 1990.

Enfält, et al. "Technological Meat Quality and the Frequency of the RN–Gene in Purebred Swedish Hampshire and Yorkshire Pigs," Proc. 40th Int. Congress Meat Sci and Tech., Aug. 1994.

Mandava, et al., Abstract Printed for Proceedings of 40th Int. Congress of Meat Sci. and Tech. "Increasing the Functionality and Use of Pale, Soft and Exudative (PSE) Pork in Canadian–Style Bacon Production" Jun. 1994.

Mandava, et al., Increasing the Funtionality and Use of Pale, Soft and Exudative (PSE) Pork in Canadian–Style Bacon Production, Proc. 40th Int. Congress Meat Sci. and Tech., Aug. 1994.

*Primary Examiner*—Arthur L. Corbin
*Attorney, Agent, or Firm*—Vogt & O'Donnell

[57] ABSTRACT

Pale, soft and exudative pork (PSE pork) is particulated, an aqueous suspension of the particulated pork is prepared, and the suspension is impregnated into a cut of normal pork.

20 Claims, No Drawings

PROCESS FOR TREATING PORK CUTS WITH PSE PORK AND COMPOSITION THEREOF

BACKGROUND OF THE INVENTION

The present invention relates to impregnation treatment of meat, particularly pork, and to impregnation of pork with an aqueous medium, such as a solution medium containing brine salt and/or a curing agent, with or without a solubilizing agent and/or a cure accelerator, and/or other food and food-acceptable substances, and in particular, the present invention relates to utilization of pale, soft and exudative pork.

In view of changing consumer attitudes and preferences over the past thirty-some years, pork producers have bred and fed pigs to reduce fat content and increase lean meat yield. As reported by Wirth, in his article "The Technology of Processing Meat Not of Standard Quality", Fleischwirtsch, 66 (8), 1986, pp. 1255–60, the lean meat:fat ratio of pigs has been altered over the years from about 1:1 to about 2:1. However, as also reported by Wirth, increased yield of lean meat has been achieved at the expense of quality since, as is accepted in the art, a significant percentage of lean-bred pigs, when alive, react adversely to stress, including stress induced by pre-slaughter procedures, which produces effects deleterious to the post-mortem meat. In fact, as reported by Topel, et al., "Porcine Stress Syndrome", *Mod. Vet. Proct.* 49:40, 1968, the stress not only may affect the quality of the meat, but also may lead to sudden death.

One result of porcine stress syndrome is a rapid post-mortem glycolysis reaction in muscle tissue which effects production and accumulation of lactic acid in the muscle tissue and which effects protein denaturation and cellular damage. Such pork is whitish, or pale, in color, and in an uncooked condition, it has a soft, dry and mushy texture. These characteristics have lent the meat to be characterized in the pork industry and in the art as pale, soft and exudative pork (hereinafter "PSE" pork). PSE pork has what is considered in the pork industry and characterized in the art as poor functionality, including poor water-binding/retention characteristics and poor cure-color characteristics.

One objective indicium for identifying what is characterized in the pork industry and in the art as PSE pork is that in less than 1 hr post-mortem, a glycolysis reaction produces lactic acid which effects a significant drop in the pH of the meat. In general, within that time period, the pH of the meat drops to at least less than about 5.8, and generally, PSE pork will acquire a pH of about 5.3 to about 5.4 within about 3 hrs post-mortem. It is also not uncommon for PSE pork to acquire a pH of less than about 5.3 upon complete rigor mortis. In addition, PSE pork may be identified because of the denaturation of proteins, which include denaturation of creatine kinase and, in particular, myosin and actomyosin, the denaturation occurring particularly during the first hour post-mortem. (Cf., Penny, Protein denaturation and water-holding capacity in pork muscle, *J.Fd. Technol.* (1969) 4, 269–273).

In comparison, post-mortem glycolysis in what is considered as "normal", and hence desirable, pork results in a pH drop which is much more gradual and thus, not particularly detrimental to proteins and to cellular structure, in that the pH drops only to about 5.9 to about 6 in about 1 hr to about 3 hrs post-mortem. Moreover, upon complete rigor mortis, i.e., within about 8 hrs to about 12 hrs, normal pork has a pH above about 5.3, and generally from about 5.4 to about 5.8 and more particularly about 5.5 to about 5.8.

Because the extent of protein denaturation and cellular damage post-slaughter are primary variables which affect the texture and meat fluid-/water binding/ holding/retention capacity (hereinafter solely "water-holding" capacity) of pork products, normal pork sets the standard for the water-holding capacity and texture which consumers have come to expect and prefer and which is therefore sought as a standard in the pork industry. That, therefore, likewise sets the standard of high-quality, high value use and hence, the price standard for the commodity.

Also in comparison, a third classification of pork is known as dark, firm and dry pork (hereinafter "DFD" pork). DFD pork has physio-chemical characteristics which, on a linear scale, oppose those of PSE pork, e.g., dark versus light color and good versus poor water-holding capacity characteristics, these characteristics being a result of post-mortem pork experiencing even less glycolosis than does normal pork. Upon completion of rigor mortis, DFD pork has a pH of above 6 and generally from about 6.2 to about 7.

A further indicium of identifying PSE pork is the genetic make-up of the pig based upon determination of the character of its halothane genes. In general, about 80% of the pig population has two recessive halothane genes, and these pigs are not particularly susceptible to porcine stress syndrome. However, if these pigs are subjects of unusual pre-slaughter environmental activity, they may stress sufficiently such that, all or part of their post-mortem meat may exhibit PSE characteristics.

On the other hand, approximately 1% of pigs have two dominant, i.e., homozygous, halothane genes, and about 100% of these pigs provide meat which is characterized post-mortem as PSE pork. In addition, about 15–20% of the pig population have heterozygous halothane genes, i.e., one dominant and one recessive gene, and when these pigs are subjected to the usual stress in conventional large-scale slaughtering processes, their meat, too, in general, will be characterized post-slaughter as PSE pork.

Thus, in general, up to about 20%, if not more, of the pig population is particularly susceptible to the effects of porcine stress syndrome which contributes to production of pork characterized post-slaughter as PSE pork. Also, however, in general, although the meat of an entire individual pig may be identified post-slaughter as PSE pork, it is found, such as with pigs having recessive halothane genes, as referred to above, or with pigs having heterozygous halothane genes, that not all cuts of any particular pig necessarily will have PSE characteristics.

Therefore, in commercial packing facilities, whereat, in general, post-mortem meat is butchered into loin, ham and bacon cuts, i.e., respectively, the part of the sides between the shoulder and pelvis (loin), the thigh, hind leg and buttocks (ham), and belly, and remainder of the back and sides (bacon), the characteristics of each cut may be evaluated separately. Thus, particular cuts of an individual pig may be identified as being PSE pork, although other cuts of the same pig may not, and these differing cuts generally are segregated during processing. In general, for any particular pig, the ham cut will be found to be most susceptible to development of PSE characteristics.

Although it is known that PSE pork takes up sodium chloride and other salts well because of its low pH, brine-cured PSE pork cuts present problems because of their poor water-holding characteristics, which are not offset by water-holding properties effected somewhat by salts. Also because of their poor water-holding characteristics, cooking PSE pork cuts for sale or consumption results in undesirable fluid losses, and hence, yield losses, which further contribute to an undesirable texture and mouth-feel. Thus, PSE pork cuts have been considered unsuitable for providing cured or cooked, or cured and cooked, or fried and/or smoked products, because of fluid losses experienced during cooking, frying and/or smoking, since the meat acquires a soft, dry and pithy texture during such processing, which is in contradistinction to a mouth-feel and bite consumers have come to expect from a quality high-value meat. Moreover, because of lactic acid accumulation, PSE pork also may be perceived as having acidic, i.e., sour, notes which further may detract from organoleptic appeal.

In addition, exudate/drip from PSE pork cuts when packaged, particularly if such have been impregnated with brine and/or curing solutions, also presents an unappealing appearance to consumers. Furthermore, the poor water-holding capacity of PSE pork cuts inhibit their usefulness in ready-to-eat, pre-cooked and chilled products and in sliced products. Usefulness of PSE pork is also inhibited significantly in other so-called convenience foods, such as microwaveable products precooked products which require significant industrial processing prior to shipment for wholesale or retail sale.

PSE pork, therefore, generally is considered a less than preferable and low-value product, and when it is sold itself as a cut, it is marketed generally as a non-label or off-label product. Thus, to enhance its value and usefulness, it has been proposed that it may be possible to use PSE pork for products wherein fluid loss is not of concern or wherein fluid loss is intended, i.e., dehydrated meat products. It is also possible to particulate the product and mix and preferably, emulsify it with other particulated meat products or by-products and/or with fillers and extenders to make luncheon meat-type products, such as bologna-type products, wherein a soft texture is not undesirable.

To address the problems posed by PSE pork, in addition to resting pigs prior to slaughter, which generally is not practical in a large-scale commercial setting, it has been proposed that the meat be rapidly chilled immediately after slaughter to inhibit the conversion of glycogen to lactic acid and substantially avoid protein denaturation. That, however, as will be appreciated, involves not only a large investment in equipment, but also would involve treating pork which is not subject to the PSE problems. Moreover, it is not necessarily desirable to so treat all meats, and procedures have not yet even been proposed to enable identification of PSE meat prior to or immediately after slaughter, which would be required if PSE/non-PSE portions of individual pigs are to be segregated immediately and subjected to a post-mortem treatment.

A further proposal to address the problems, which is much more practical and applicable to treatment of all meat without discrimination, has been advanced by Knipe, etal., "Effects of Stress-Susceptibility of Hogs and Processing Treatments on the Quality of Pork Products", Proc. Int. Congress of Meat and Sci. and Tech. Vol. 2, p. 662, 1990, wherein studies demonstrated that a quality improvement was effected by injecting prerigor pork with a curing pickle brine containing sodium tripoly-hexametaphosphate.

However, PSE pork, which constitutes a significant percentage of slaughtered pork products, has been considered a problematic product and caused significant monetary losses in the industry. Thus, further means to address and alleviate the problems long have been desired and sought together with, alternatively, means to obtain more economic value from PSE pork than is provided by the uses noted above.

SUMMARY OF INVENTION

The present invention provides a process for treating pork and provides a pork composition which enable, particularly in a commercial context and in comparison with prior PSE products, obtaining a high quality and particularly a premium, high-value use of PSE pork. The present invention also provides for extending pork products, i.e., increasing the weight of pork products, without employing non-meat additives, e.g., starches and other fillers and extenders, as are known in the art. Hence, a product which is extended "naturally" is provided, i.e., a product which does not contain non-meat fillers/extenders.

In the context of this disclosure, PSE pork is considered as being pork which has the color and texture characteristics which are identified above and recognized throughout the pork industry. It is considered as being pork having a genetic make-up including at least one dominant halothane gene. In addition, PSE pork is considered as being pork which has experienced a pH drop to a pH of below about 5.8 within 1 hour post-mortem, and particularly to a pH of from about 5.3 to about 5.6 within about 3 hours post-mortem, with the attendant protein denaturation noted above, and denaturation of creatine kinase and/or more particularly, denaturation of myosin and/or actomyosin are further identifying indicators.

Further, the term PSE pork as used herein is intended to include pork having a genetic make-up including a dominant RN gene. Although, RN-gene pork does not exhibit, in general, the rapid first hour pH drop and extent of protein denaturation experienced by PSE pork, it does exhibit a low post-mortem/post-rigor pH which impairs its water-holding properties and hence, its functionality and usefulness.

In the context of this invention, "normal" pork is that which has characteristics described in the BACKGROUND above and is that which is not characterized in and accepted in the industry and art as PSE or DFD pork. Thus, normal pork may be characterized by having a pH on the order of from about 5.4 to about 6.0 and generally about 5.4 to about 5.8 and more particular a pH of from about 5.5 to about 5.8. Further, the term normal pork, as meant herein, is not intended to exclude pork which has a heterogeneous halothane genetic make-up if such meat has not experienced a pH drop of below about 5.8 within about 1 hr of slaughter and/or if such pork has a post-rigor mortis pH of from above 5.4 to about 6.0.

A process of the present invention is characterized in that a cut of normal pork is impregnated with an aqueous suspension of particulate PSE pork.

A composition of the present invention is characterized in that a cut of normal pork contains particulated PSE pork impregnated therein.

In the context of the present invention, the normal pork cut into which the PSE pork is impregnated is meant to be whole pieces of pork and is to be distinguished from masses of comminuted meats and/or otherwise particulated meats. A "cut" is intended to mean an entire loin, ham, or bacon of a pig and further sub-divided cuts thereof, and generally premium, high-value cuts will be trimmed.

Also in the context of the present invention, the PSE pork which is employed is raw, as is the normal pork.

The present invention is characterized further in that although the aqueous medium of the suspension could be water alone, such preferably is a brine medium, and as is conventional in the art, a brine medium is meant herein to be an aqueous medium which includes sodium chloride, although employment of potassium chloride or other substitutable food-acceptable salt is not precluded.

Further, the aqueous medium or the brine may be a curing solution, as is known in the art, and therefore, the aqueous medium includes at least one curing agent, such as nitrite and/or nitrate salts, particularly the sodium salts thereof. In addition such curing solution mediums also preferably include at least one solubilizing agent, such as an alkaline phosphate salt, including in particular tripoly-hexametaphosphate, and/or a cure accelerator/antioxidant, such as ascorbic acid and/or its isomers and salts thereof, particularly sodium erythorbate.

Further, in the context of the foregoing, the present invention also includes a composition of an aqueous suspension of particulated PSE pork wherein the aqueous suspension medium is water alone or a brine or a curing solution, including a brine curing solution. The present invention also includes a cured normal pork cut having particulate PSE pork and a brine or a curing solution, including a brine curing solution, impregnated therein.

The process of the present invention is characterized further in that impregnation is effected by injecting the suspension into the normal pork. For best results, the injected meat is tumbled after injection to effect uniformity of suspension distribution, and preferably, the meat is subjected to a tumbling/resting/tumbling sequence, as is known in the art.

In addition, the invention is characterized further in that the impregnated pork is treated to prepare a "pre-cooked" composition, which is meant herein to include smoking procedures to prepare a smoked composition. In the context of the present invention, as used herein, pre-cooking is intended to include any cooking procedure, particularly cooking procedures carried out prior to retail or wholesale, and in particular, any heating procedure which subjects the product to conditions which are suitable for preserving or preparing the meat for consumption. In the context of the present invention, the heating need not be carried out such that the cut is cooked suitably for consumption and thus, such pre-cooking heating is intended to mean any heating sufficient to pasteurize or otherwise render the meat microbiologically stable for storage for subsequent sale or use, including a sous vide process, or otherwise to cook the food at least partially.

Further, therefore, the present invention also includes a pasteurized or otherwise at least partially cooked PSE-impregnated pork composition. In particular, the present invention includes a process and the product obtained by employing a normal pork cut suitable for preparing Canadian-style bacon, as defined by the U.S. Department of Agriculture, impregnating it and processing it to obtain a Canadian-style bacon.

DETAILED DESCRIPTION OF THE INVENTION

In the context of the present invention, the term "aqueous suspension" is used in its conventional manner and thus, is intended to mean a non-colloidal dispersion of solid particles in an amount of water.

The aqueous suspension is characterized and distinguished from what is known in the art as a meat emulsion in that the suspension of the present invention has a lesser solids content than do emulsions which are also known in the art as batters. For example, emulsions generally have a meat content in excess of 50% by weight and in general, in excess of at least 75% by weight, based upon the weight of the emulsion. Emulsions, therefore, generally have a pasty-type consistency. The suspension employed in the present invention has a thinner consistency, and although suspensions of the present invention may have a PSE meat content of up to about 30% by weight based upon the weight of the suspension, in general, the suspensions may have a PSE meat content of up to about 25% by weight but preferably, only up to about 20% by weight and more preferably, from about 5% by weight to about 15% by weight, each weight being based upon a weight of the suspension and the weight of the meat including its fluid content.

As will be appreciated, the maximum amount of PSE meat suspension impregnated in a normal cut will depend, of course, upon the character of the normal pork cut being treated, including, for example, the water-holding capacity of the normal pork, and such may range up to an amount of about 25% PSE meat by weight, including its fluid content, based upon the weight of the combined PSE/normal meat composition. Generally, however, it will be found that amounts of PSE meat on the order of from about 5% to about 15% by weight, based upon the weight of combined PSE/ normal composition, may be incorporated readily into the normal pork.

In the present invention, the PSE pork employed may include what are known in the industry as trimmings, but particularly for premium, high value products, the trimmings and some connective tissue may be removed prior to processing the PSE pork in accordance with the invention. The PSE pork employed is size-reduced to a particulate form which has a particle size which is suitable for being impregnated into the normal pork, and such may be effected by equipment known in the art and available commercially. Preferably, the PSE pork is particulated to have a particle size so that it is suitable for being injected into the normal pork by injection equipment known in the art and available commercially.

Depending upon the size of the cut of the PSE pork being employed, chipping, grinding/comminution and flaking and bowl chopping equipment known in the art may be used for size-reduction. The PSE pork is size-reduced best in a frozen condition and under refrigerated conditions which, as one skilled in the art will appreciate, facilitates particulation efficiency and operates to reduce deleterious effects to the character of meat, and although not required, tempering procedures known in the art may be employed. Thus, in carrying out the size-reducing operation, procedures desirably are employed for cooling the equipment by circulation of refrigerant fluids in the size-reduction equipment and/or introducing cooled gaseous or liquid $N_2$ to cool the pork and equipment, as are known in the art. In general, the PSE pork which is size-reduced should have a temperature of less than about 0° C., and the PSE pork may have a temperature on the order of from about −25° C. to about 0° C., and preferably from about −20° C. to about −4° C., and more preferably from about −10° C. to about −4° C.

The particulate PSE pork employed for preparing the suspension desirably has a powder-like character, and as will be appreciated in view of the discussion below, the fiber of the particles generally are fibrous in nature and generally will extend lengthwise. For example, the particles may extend for a length of up to about 5 mm, but preferably, the pork is size-reduced so that such fibers extend in length for only up to about 3 mm, such as particularly, from about 1 mm to about 3 mm. The powder-like character desired is gained by size-reducing the pork so that these particles have, in general, a thickness on the order of from about 100 µ to about 1000 µ and generally, on the order of from about 400 µ to about 800 µ.

The particulate PSE pork may be obtained, for example, by size-reducing the PSE pork in two stages such as by first treating PSE cuts with a flaker device and then with a bowl chopper device, as are known in the art. One may employ a flaker device such as a BUTCHER BOY flaker, which may be obtained from Lasar Manufacturing Company (U.S.A.), or a HYDRAU-FLAKER flaker, which may be obtained from General Manufacturing Corporation (U.S.A.). As is known, the meat processed by such flaker machines will provide flake-like particles having dimensions generally ranging from about 2 mm to about 30 mm. The flakes then are further size-reduced with such as Krämer & Grebe GmbH cutter-mixer (Germany) and like bowl chopper devices known in the art and commercially available.

Subsequent to the size-reduction steps above, the powder is added to the aqueous medium for suspension formation. The formation of the suspension is carried out under conditions so that the temperature of the pork and the mechanical action on the pork, in particular, are such that deleterious effects, particularly extraction of proteins by water and/or solubilization of proteins, are minimized and preferably, substantially avoided. For suspension formation, milling equipment known in the art may be employed. However, although employment of what is known in the art as emulsion mills generally is not preferred, such may be employed, if necessary, under conditions, particularly of temperature, which minimize and preferably, substantially avoid extraction and/or solubilizing of proteins. Preferably, prior to suspension formation, and to facilitate the same, the aqueous medium and powder are mechanically mixed such as by stirring to achieve uniformity of the aqueous medium and powder.

Mill apparati which will be found to be effective to obtain a suspension which may be impregnated readily into normal pork include equipment manufactured by Cozzini, Inc. (U.S.A.), and in particular, Cozzini machines having the designations AR-701 and AR-901 are employed usefully. In addition, process conditions disclosed in Cozzini et al. U.S. Pat. No. 4,960,599 may be employed, and such are incorporated herein by reference as if fully set forth.

In addition to merely employing water or brine, aqueous media which may be employed to prepare the suspension include those conventionally employed in the brine, curing, smoking and/or cooking arts, and thus, such are prepared with a view to the end product sought to be produced. In particular, however, alkaline phosphates preferably are employed, particularly tripolyphosphate salts, since such tend to result in enhancing water-holding capacity of the composition of the invention. It also is preferred to employ a hexametaphosphate salt in an amount generally from about 5% to about 15% by weight based upon the total weight of phosphate salts employed, this salt being employed for its water-softening, solubilizing effect, as is known in the art.

In carrying out suspension formation and any prior mixing, temperatures on the order of less than about 5° C. and preferably below about 0° C. are employed, more preferably, temperatures in the order of from about −15° C. to −5° C. are employed. Thus, the aqueous medium, be it a brine, curing solution, or brine curing solution, may be made with ice addition, or the mixing of the aqueous medium and powder may be carried out in chilled equipment, such as heat-exchangers known in the art, to effect such temperatures.

Although, if the PSE pork is finely enough particulated, one might tumble and/or use pressure or vacuum to effect impregnation, more practically, the suspension is impregnated into the normal pork by injection, the criterion of significance being that the needles have a conduit and outlet aperture(s) of sizes suitable for passing the particulate pork therethrough. Injection may be carried out multiple times to achieve any of various injection levels, as is known in the art.

Any of various commercially available injection apparati may be employed and include such as BELAM injection apparati by Wolfking Danmark Corporation (Denmark) or injection apparati by Mepsco, Inc. (U.S.A). In general, injection needles having an internal diameter on the order of from about 2.5 mm to about 3.5 mm and an exit opening on the order of about 2 mm to about 3 mm will be found suitable, and injection pressures on the order of from about 1.5 to about 4 bar, and preferably from about 2.7 bar to about 3.5 bar, may be employed. In addition, although the normal pork which is injected may have a temperature of up to about 10° C., preferably it has a temperature of less than about 4° C. and more preferably from about 2° C. to about 4° C.

As referred to above, after injection, it is preferred, as is common in the art, at least to tumble the impregnated cut and more preferably, to perform a tumbling and resting sequence, as is conventional in the art, again under refrigerated conditions on the order of from about −5° C. to about 10° C. and preferably from about 2° C. to about 4° C.

Subsequent to impregnation and dispersal of the suspension, the impregnated cuts may be placed in casings which are substantially fluid-, i.e., water-, impermeable, such as fibrous or plastic casings, as are known and used in the art for shaping and molding meat. As will be appreciated, the casings not only shape and mold a plurality of impregnated cuts, but also urge the fluids to be retained within the meat while it is being manipulated such as by cooking or curing and/or curing and cooking, as also is well-known in the art. However, encasing the impregnated cuts should not be deemed as a requirement for practice of the present invention.

Whether or not placed in casings, pre-cooking of the impregnated meat may be carried out by any of known cooking methods, and since the invention is directed to pork products, the aqueous impregnation medium and heating methods for preservation/cooking methods may be any of those known in the art including procedures for smoking, such procedures including those generally discussed in Ashbrook, *BUTCHERING, PROCESSING AND PRESERVATION OF MEAT*, 1955, Van Nostrand Reinhold Company, NY, N.Y., and in Dubbs, et al., *THE EASY ART OF SMOKING FOOD*, 1977, Winchester Press, NY, N.Y.

In addition, PSE pork treated in accordance with the Knipe article noted above, wherein pre-rigor PSE pork is treated with addition of sodium tripolyphosphate, may also be employed in the process of the present invention and be incorporated in a composition of the present invention, and the disclosure of that article is incorporated herein by reference as if fully set forth.

Although, as also indicated above, it is desired to obtain an entirely "naturally" extended meat composition, other substances which are known in the art as gel-forming agents, also known as binders, and/or fillers, also known as extenders, may be employed in the suspension or also impregnated in the normal pork, such substances generally being considered as enhancing cooking yields, since they act as water-binders and/or as film-forming agents. Such substances include starches and like carbohydrate substances and also include milk proteins, particularly whey protein concentrates and/or isolates, and/or other meat coaguable proteins and protein-containing substances, including egg albumen and gelatin, and include also pectin and gums. However, such substances preferably are excluded, since these substances will detract from the advantages provided by the present invention, i.e., obtaining an impregnated pork which has organoleptic characteristics, particularly texture and mouth-feel, which are substantially equivalent with that of a normal pork cut which has been prepared in the same manner, e.g., such as curing, etc., but without PSE pork addition.

As will be seen from the Examples below, in comparison with normal pork, it has been discovered that even though PSE pork has poor functionality, particularly because of its poor water-holding capacity, impregnation of normal pork with particulate PSE pork does not increase drip loss to an extent of significance and does not adversely affect cooking yields to an extent of significance, as compared with like normal pork prepared in the same manner but without PSE pork addition.

Moreover, although it has been found that the PSE pork may have an effect upon color of the product somewhat, the pH of a PSE/normal pork composition of the present invention is substantially the same as that of normal pork similarly prepared but without PSE addition, and texture also is not affected adversely. Hence, it has been discovered that since the PSE pork does not adversely affect the quality and organoleptic characteristics of the normal pork, the value of this unfavored low-end product is enhanced substantially by being incorporated into a premium high-value normal pork.

Thus, proceeding in accordance with the process of the present invention, which provides a composition of the invention, enables PSE pork, which would provide premium high-value cuts if not for its inherent character due to effects of such as porcine stress syndrome and/or its pH, to be used in a premium high-value context. This use with a premium high-value product, i.e., normal pork, is accomplished without loss of the premium, high-value character of the normal pork since the particulate PSE pork may be prepared so it retains significant fibrous character and thereby does not detract from the texture and mouthfeel of the normal pork, as do other known additives such as gel-forming agents and fillers and also fats. Thus, because of this, it is preferred that cuts of PSE pork are incorporated into like cuts of normal pork, i.e., loin to loin, etc., although such is not required.

EXAMPLES

The following Examples are set forth to illustrate the present invention further, and as was specifically indicated in the foregoing disclosure, percentages are set forth by weight.

EXAMPLE I

Post-rigor pork loins which are suitable for preparing a Canadian-style bacon, but which have been identified as PSE pork and have a pH below 5.3, are selected and trimmed of fat and connective tissue. The loins are chilled at a temperature of about −20° C. to freeze them. The frozen loins are size-reduced with a BUTCHER BOY flaker under chilled conditions, which provides flake-like particles, and then the flakes are size-reduced further with a Krämer & Grebe bowl cutter under chilled conditions, and a powder-like product having a temperature of about −6° C. is obtained.

A brine curing solution is prepared with water and ice having a water to ice ratio of about 2:1, and with sodium chloride, dextrose, sodium erythorbate and nitrite. Sodium tripolyphosphate and hexametaphosphate, in a ratio of about 9:1, also are included in the solution. The particulate PSE meat is added to the brine to obtain an admixture containing about 67% water, about 1.5% dextrose, about 0.1% erythorbate, about 0.04% nitrite, about 0.8% phosphates and the balance PSE meat. The curing brine solution and meat are kept chilled at about −6.5° C. and mechanically stirred to obtain substantially uniform mixture.

After stirring, the brine curing solution and PSE meat mixture is fed through a Cozzini AR-701 mill so that the mixture is treated at a temperature of about −6.5° C., and the mixture is passed through the mill three times which results in providing a fine suspension.

The suspension is maintained at a temperature of about −6.5° C. and provided to a BELAM injection apparatus for injection in to normal pork loins. The needles having an internal diameter of 3 mm and a 2.5 mm exit hole. The normal pork loins have a temperature of about 2° C. and are injected twice with the suspension under a pressure which varies from about 3 bar to about 3.2 bar to inject an amount of the suspension so that an injected composition having about 91% normal pork and about 9% PSE pork based upon the weights of the two meats is obtained.

The injected loins are size-reduced by cutting to obtain pieces having dimensions of about 12 cm ×12 cm × 10 cm. The injected pieces are vacuum tumbled in INJECT STAR tumblers for about 4 hrs at a temperature of about 10° C., the tumbled pieces are rested for about 16 hrs at about 4° C. and then tumbled again for about 1 hr. The tumbled pieces then are stuffed into fibrous casings with a RISCO vacuum stuffer.

The encased products are heated and smoked in a Mauer and Sohne oven for preparing Canadian-style bacon for a time to obtain an internal meat core temperature of about 68° C. The pre-cooked, smoked products then are chilled at a temperature of about 2° C. for about 24 hrs. The casing then is removed and the products are vacuum-packed.

COMPARISON EXAMPLE

A brine is prepared with the same components as noted in Example I above and injected into normal pork suitable for preparing a Canadian-style bacon. The brine curing solution is injected at a level of about 30% of the normal meat green (uninjected) weight so that the injected normal product has about the same amounts of salt, dextrose, erythorbate, nitrite, phosphates and water as the PSE-injected product of EXAMPLE I. The injected normal meat is size reduced by cutting it into pieces as in EXAMPLE I, and the size-reduced cuts are treated in the same manner as the PSE-injected size-reduced cuts of EXAMPLE I.

pH analysis of the product of the normal loin and the EXAMPLE I PSE-added product showed that there is no difference of significance between the pH's of the products.

As may be seen from the Table below, based upon weights taken before and after cooking, after chilling and after removing the casing ("peeling"), for determining processing yields, it is found that the incorporation of the PSE meat increased yields, although not to a degree of significance.

TABLE I

| Product | YIELDS | | |
|---|---|---|---|
| | Cooking(%) | Chilling(%) | Peeling(%) |
| EXAMPLE I (91% Normal + 9% PSE) | 92.60 | 91.04 | 90.10 |
| 100% Normal | 91.55 | 89.78 | 88.71 |

Drip loss determinations also are performed on vacuum-packed samples which have been stored for 21 days at about 4° C. Based upon the weight of the product taken before cooking, it is found that although the EXAMPLE I product exuded less drip, the difference is not one of significance.

Thus, even though PSE pork has poor water-holding or binding capacity, the PSE pork of EXAMPLE I does not adversely affect yield losses and drip.

Analytical evaluations of color indicated that the Hunter L value of the EXAMPLE I and normal products differ to a degree of significance (EXAMPLE I—54.05; normal—59.07) with the EXAMPLE I product being darker which is surprising, since it would be expected to lighten the normal meat, but the Hunter a and b values do not differ between the products to a degree of significance. Analytical evaluations of texture also indicate that the EXAMPLE I and normal products do not differ to any degree of significance.

As is clear from the foregoing, various modifications of the present invention may be made without departure from the spirit and scope of the disclosure, and the invention may be embodied suitably in the absence of elements, members, constituent composition components and/or process steps and/or parameters not specifically disclosed or excluded herein.

We claim:

1. A process for treating pork cuts comprising impregnating a cut of normal pork with an aqueous suspension of particulate PSE pork.

2. A process according to claim 1 wherein the suspension is injected into the normal pork to impregnate the normal pork with the suspension.

3. A process according to claim 2 further comprising tumbling the impregnated normal pork to distribute the impregnated suspension within the normal pork.

4. A process according to claim 1 wherein the suspension further contains a meat curing agent.

5. A process according to claim 4 wherein the suspension further contains a solubilizing agent and a cure accelerator/antioxidant.

6. A process according to claim 1 wherein the suspension contains the particulate PSE pork in an amount of up to about 30% by weight.

7. The product of the process of claim 6.

8. A process according to claim 1 wherein the suspension contains the particulate PSE pork in an amount of from about 5% to about 15% by weight.

9. The product of the process of claim 8.

10. A process according to claim 1 further comprising heating the impregnated normal pork to cook the impregnated-pork at least partially.

11. A process according to claim 1 wherein the impregnated normal pork is smoked to cook the impregnated pork at least partially.

12. A process according to claim 1 wherein the PSE pork has a genetic make-up which includes at least one dominant halothane gene.

13. A process according to claim 1 wherein the PSE pork has a genetic make-up which includes an RN gene.

14. A process according to claim 1 wherein the normal pork is a cut for preparing Canadian-style bacon.

15. The product of the process of claim 1.

16. A pork composition comprising a normal pork cut having particulate PSE pork impregnated therein.

17. A pork composition according to claim 16 wherein the PSE pork has a genetic make-up which includes at least one dominant halothane gene.

18. A pork composition according to claim 16 wherein the PSE pork has a genetic make-up which includes an RN gene.

19. A pork composition according to claim 16 wherein the composition is cured and at least partially cooked.

20. A pork composition according to claim 16 wherein the normal pork is a cut for preparing Canadian-style bacon.

* * * * *